US008530019B2

(12) United States Patent
He et al.

(10) Patent No.: US 8,530,019 B2
(45) Date of Patent: Sep. 10, 2013

(54) PAINTED POLYOLEFIN ARTICLES

(75) Inventors: Robert Hai-Feng He, Shanghai (CN); Stephen Yau-Sang Cheng, Hong Kong (CN); Shuwen Peng, Shanghai (CN); Jose Manu Rego, Houston, TX (US); Gloria Stucchi, Zurich (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/578,977

(22) PCT Filed: Feb. 22, 2010

(86) PCT No.: PCT/CN2010/070704
§ 371 (c)(1),
(2), (4) Date: Aug. 14, 2012

(87) PCT Pub. No.: WO2011/100871
PCT Pub. Date: Aug. 25, 2011

(65) Prior Publication Data
US 2012/0308752 A1  Dec. 6, 2012

(51) Int. Cl.
*B29D 22/00* (2006.01)
(52) U.S. Cl.
USPC ............. 428/36.91; 526/348; 525/88; 525/95
(58) Field of Classification Search
USPC ............... 428/6.91, 36.91; 526/348; 525/88, 525/95, 240, 321, 323, 324
See application file for complete search history.

(56) References Cited

U.S. PATENT DOCUMENTS

| 4,997,720 | A | 3/1991 | Bourbonais et al. |
| 5,272,236 | A | 12/1993 | Lai et al. |
| 5,278,272 | A | 1/1994 | Lai et al. |
| 5,360,868 | A | 11/1994 | Mosier et al. |
| 5,763,534 | A | 6/1998 | Srinivasan et al. |
| 5,837,764 | A | 11/1998 | Akagawa |
| 5,962,573 | A | 10/1999 | Berta |
| 5,986,028 | A | 11/1999 | Lai et al. |
| 6,107,404 | A | 8/2000 | Ryntz |
| 6,433,063 | B1 | 8/2002 | Berta |
| 6,710,129 | B2 | 3/2004 | Matayoshi et al. |

(Continued)

FOREIGN PATENT DOCUMENTS

| EP | 0356101 A2 | 2/1990 |
| EP | 0248543 B1 | 12/1991 |

(Continued)

OTHER PUBLICATIONS

Dobrynin, J. Chem. Phys., 107 (21), 1997, pp. 9234-9238.
Potemkin, Physical Review E, vol. 57, No. 6, 1998, pp. 6902-6912.

*Primary Examiner* — N. Edwards
(74) *Attorney, Agent, or Firm* — Whyte Hirschboeck Dudek S.C.

(57) ABSTRACT

Articles having a Shore A hardness of 50 to 95 and made from polyolefin compositions comprising an ethylene-alpha-olefin interpolymer (random or block or a mixture of the two) are paintable without the need for a primer or other surface treatment with paints free of phthalate-based plasticizer and designed to paint SBS- or SEBS-type rubber based compositions. These polyolefin compositions are free of (1) phthalate-based plasticizer, (2) halogen-containing polymer, and (3) leachable, small polymeric units derived from styrene monomer. In addition, the content of the alpha-olefin in the polyolefin composition is at least 9.7 mole percent.

9 Claims, 1 Drawing Sheet

(56) References Cited

U.S. PATENT DOCUMENTS

| | | |
|---|---|---|
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,608,668 B2 | 10/2009 | Li Pi Shan et al. |
| 7,718,735 B2 * | 5/2010 | Kanzaki ............ 525/89 |
| 7,863,379 B2 * | 1/2011 | Kapur et al. ............ 525/88 |
| 8,067,319 B2 * | 11/2011 | Poon et al. ............ 442/329 |
| 2006/0160942 A1 * | 7/2006 | Kanzaki ............ 524/451 |
| 2006/0199930 A1 | 9/2006 | Li Pi Shan et al. |
| 2007/0112127 A1 * | 5/2007 | Soediono et al. ............ 524/543 |
| 2008/0045638 A1 | 2/2008 | Chapman et al. |

FOREIGN PATENT DOCUMENTS

| | | |
|---|---|---|
| WO | 2005090427 A2 | 9/2005 |
| WO | 2006102150 A2 | 9/2006 |
| WO | 2009086091 A1 | 7/2009 |

\* cited by examiner

PAINTED POLYOLEFIN ARTICLES

FIELD OF THE INVENTION

This invention relates to soft, painted polyolefin articles free of phthalate plasticizer, halogen-containing polymer and leachable, small polymeric units derived from styrene monomer. In one aspect the invention relates to such articles with a Shore A hardness of 50 to 95 while in another aspect, the invention relates to such articles comprising a polyolefin random interpolymer with a density of less than 0.91 g/cm$^3$ or a polyolefin elastomer that has an olefin multi-block structure.

BACKGROUND OF THE INVENTION

Soft polyvinyl chloride (PVC) is widely used to produce articles like toys, footwear, profiles, instrument panel skins, furniture, sporting goods and the like. Soft PVC is PVC that contains one or more plasticizers, e.g., a phthalate. PVC is used in these applications for a number of reasons not the least of which are that it is paintable without a primer or other surface treatment, e.g., plasma or corona, and it imparts a Shore A hardness to the article of 50-95. As a frame of reference, a door seal typically has a Shore A hardness of about 55, an automotive tire tread of 50-70, and hydraulic O-rings of 70-90.

Interest exists in replacing the soft PVC in these applications with materials that are considered more environmentally friendly, e.g., free of halogen-containing polymer. Especially with respect to toys for small children, interest exists for substitutes for soft PVC that do not contain components, e.g., phthalate-based plasticizers, that will leach or otherwise migrate from the article under normal use conditions yet are paintable without the need for a primer or other surface treatment and will impart the desired Shore A hardness to the article.

Certain rubbers, e.g., styrene-butadiene-styrene (SBS) and styrene-ethylene/butylene-styrene (SEBS), and compositions containing these rubbers, can be painted without a primer or first receiving some other surface treatment by certain paints, e.g., acrylic-modified paint. These rubbers can also impart the desired Shore A hardness to the article, but the presence of leachable, small (e.g., typically less than 4 units in length) polymeric units derived from styrene monomer, e.g., dimers and trimers, in these rubbers disfavors their use in many applications, particularly toys.

Other rubbers, e.g., polyolefin elastomers such as ethylene-propylene (EP) and ethylene-propylene-diene monomer (EPDM), do not contain leachable, small polymeric units derived from styrene monomer but typically require a primer or other surface treatment for painting, This adds, of course, to the time and cost of producing such articles.

SUMMARY OF THE INVENTION

Articles having a Shore A hardness of 50 to 95 and made from polyolefin compositions comprising an ethylene-alpha-olefin interpolymer (random or block or a mixture of the two) are paintable without the need for a primer or other surface treatment with paints designed to paint SBS- or SEBS-type rubber-based compositions. These polyolefin compositions are free of (1) phthalate-based plasticizer, (2) halogen-containing polymer, and (3) leachable, small polymeric units derived from styrene monomer.

In one embodiment the invention is an article made from a polyolefin composition (A) comprising at least one of a (1) random ethylene-alpha-olefin interpolymer having a density of equal to or less than ($\leqq$) 0.91 g/cm$^3$, or (2) multi-block ethylene-alpha-olefin interpolymer, (B) free of (1) phthalate-based plasticizer, (2) halogen-containing polymer, and (3) leachable, small polymeric units derived from styrene monomer, and (C) having a Shore A hardness of 50 to 95, with the proviso that the content of the alpha-olefin in the polyolefin composition is at least 9.7 mole percent.

In one embodiment the invention is a painted article (A) made from a polyolefin composition (1) comprising at least one of a (a) random ethylene-alpha-olefin interpolymer having a density of equal to or less than ($\leqq$) 0.91 g/cm$^3$, or (b) multi-block ethylene-alpha-olefin interpolymer, (2) free of (a) phthalate-based plasticizer, (b) halogen-containing polymer, and (c) leachable, small polymeric units derived from styrene monomer, and (3) having a Shore A hardness of 50 to 95, with the proviso that the content of the alpha-olefin in the polyolefin composition is at least 9.7 mole percent, and (B) painted without primer or other surface treatment with paint free of phthalate-based plasticizer, and (A) designed for painting an SBS- or SEBS-type rubber based composition, or (B) is an acrylic-modified paint designed for painting a polypropylene-based composition In one embodiment the paint of is also free of at least one of a (i) halogen-containing polymer, and (ii) styrene monomer and/or leachable, small polymeric units derived from styrene monomer, such that the paint is not a source of such material in the finished painted article, e.g., a toy.

If a random interpolymer, then preferably it is a homogeneous ethylene-α-olefin interpolymer, more preferably a substantially linear, homogeneously ethylene-α-olefin.

If a block interpolymer, then the interpolymer is an ethylene multi-block interpolymer with (a) a molecular fraction that elutes between about 40° C. and about 130° C. when fractionated using temperature rising effluent fractionation (TREF), characterized in that the fraction has a block index of at least 0.5 and up to 1 and a molecular weight distribution (PDI, Mw/Mn, MWD) greater than 1.3, or (b) an average block index greater than zero and up to 1.0 and an MWD greater than 1.3. In addition, the ethylene multi-block interpolymer typically has at least one of the following properties: (i) a molecular weight distribution of greater than 1.3, (ii) a density of less than 0.90 g/cc, (iii) a 2% secant modulus of less than 150 megaPascal (mPa) as measured by ASTM D-882-02, (iv) a melt point of less than 125° C., (v) an α-olefin content of at least 10 and less than 80 wt % based on the weight of the interpolymer, (vi) a Tg of less than −35° C., and (vii) a melt index (MT) of less than 100 grams per 10 minutes (g/10 min).

For good paintability of an article made from the polyolefin composition of this invention, the minimum ethylene-α-olefin interpolymer concentration in the composition is dependent upon a number of factors, including the structure of the ethylene-α-olefin interpolymer (random, block or a mixture of the two), the α-olefin comonomer (e.g., typically a $C_3$-$C_{10}$), the other components in the composition (e.g., polyethylene, polypropylene, etc.), and the paint to be applied to the article. For an article made from a composition comprising polypropylene and an ethylene-1-octene random or multi-block interpolymer to be painted with an acrylic-modified paint designed for painting articles made from an SEBS-based composition, typically the inventive composition comprises at least 10 mole percent (mol %) of the 1-octene comonomer. For an article made from a composition comprising polypropylene and an ethylene-1-octene random or multi-block interpolymer to be painted with a paint designed for painting articles made from an SBS-based composition, typically the inventive composition comprises at least 10 mol % of the octene comonomer.

BRIEF DESCRIPTION OF THE DRAWINGS

FIG. 1 shows adhesion rating as a function of α-olefin co-monomer content for SEBS paint V37.

FIG. 2 shows adhesion rating as a function of α-olefin co-monomer content for SBS paint 5900.

DESCRIPTION OF THE PREFERRED EMBODIMENT

Definitions

Figure 1:
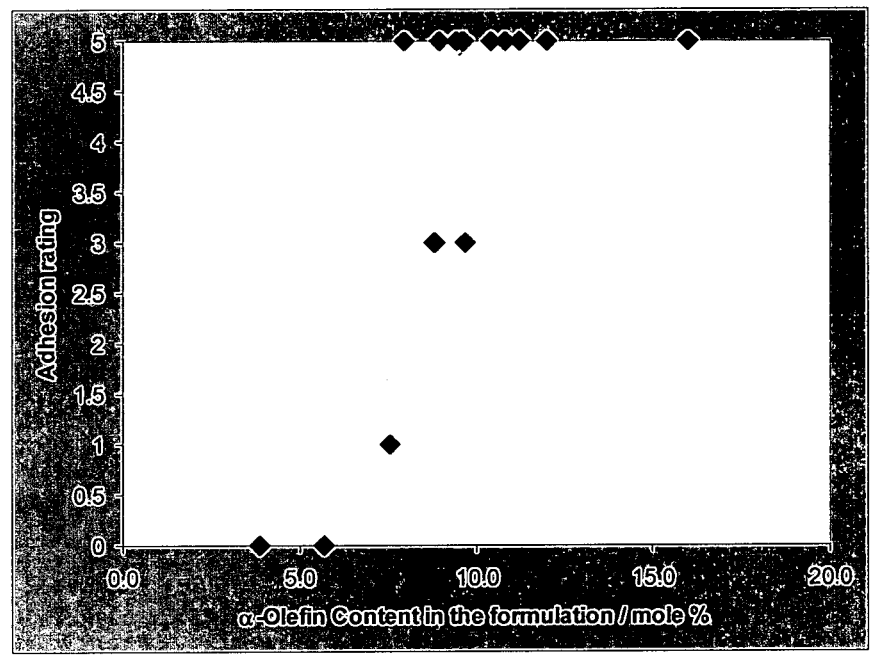
FIG. 1 is a graph reporting the adhesion rating of a paint designed for articles comprising SEBS rubber on articles made from polyolefin compositions comprising various levels of an ethylene-α-olefin interpolymer. The adhesion rating is reported as a function of the α-olefin comonomer content in the composition.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the alpha-olefin content of the random or block interpolymer, the Shore A hardness of the article, and the density of the random interpolymer.

"Composition", "formulation" and like terms means a mixture or blend of two or more components. In the context of the inventive compositions of this invention, the mixture or blend of materials include a polyolefin and an ethylene-α-olefin interpolymer and, optionally, one or more fillers or additives.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Such blends include both mechanical blends made by admixing two or more of the components together in any mechanical manner, e.g., stirring, tumbling, folding, etc., and in-situ or in-reactor blends made by forming and/or mixing the blend components together during the polymerization process in which the polymer components are made.

Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Olefin-based polymer", "polyolefin" and like terms mean a polymer containing, in polymerized form, a majority weight percent of an olefin, for example ethylene or propylene, based on the total weight of the polymer. Non-limiting examples of olefin-based polymers include ethylene-based polymers and propylene-based polymers.

"Random ethylene-α-olefin interpolymers", "homogeneous interpolymers" and like terms mean an interpolymer or interpolymer in which the comonomer is randomly distributed within a given interpolymer molecule and in which the majority, if not substantially all, of the interpolymer molecules of the bulk polymer have the same or essentially the same ethylene/comonomer ratio within that interpolymer. In contrast, nonrandom or heterogeneous interpolymers are interpolymers in which the majority of the interpolymer molecules of the bulk polymer do not have the same or essentially the same ethylene/comonomer ratio.

"Bulk polymer" and like terms mean the polymer which results from the polymerization process.

"Plasticizer" and like terms mean an additive that can increase the flexibility and lower the glass transition temperature of a polymer thus increasing the flexibility and softening the feel of an article made from the polymer. Exemplary plasticizers include mineral oils, abietates, adipates, alkyl sulfonates, azelates, benzoates, chlorinated paraffins, citrates, epoxides, glycol ethers and their esters, glutarates, polybutenes, ricinoleates, hydrocarbon oils, isobutyrates, oleates, pentaerythritol derivates, phosphates, phthalates, esters, sebacates, sulfonamides, tri-and pryromellitates, biphenyl derivates, stearates, difuran diesters, fluorine-containing polymers, and the like. Where used, the amount of the plasticizer in the polymer blend can be from greater than 0 to 15 wt %, from 0.5 to 10 wt %, or from 1 to 5 wt % of the total weight of the polymer blend. Some plasticizers are described in George Wypych, "*Handbook of Plasticizers*," ChemTec Publishing, Toronto-Scarborough, Ontario (2004).

"Phthalate-based plasticizer" and like terms mean an additive based on an ester of phthalic acid or similar compound. Common phthalate-based plasticizers include bis(2-ethylhexyl) phthalate, diisononyl phthalate, bis(n-butyl) phthalate, butyl benzyl phthalate and diisodecyl phthalate.

"Free of" and like terms mean that if a composition, paint or the like contains any amount of a particular substance, then the amount of that substance that it does contain is less than the amount allowed by a particular government regulation, customer specification, or the like.

"Leachable, small polymeric units derived from styrene monomer" and like terms mean small molecules of typically less than 4 styrene units in length, such as dimers and trimers. Such molecules tend to migrate over time from within an article, particularly a molded article, to the surface of the article.

Melt index ($I_2$, grams per 10 minutes or g/10 min) of the ethylene-based polymers used in the practice of this invention is measured by the procedure of ASTM D1238 (190° C., 2.16 kilograms or kg).

Density (grams per cubic centimeter or g/cm$^3$) of the ethylene-based polymers used in the practice of this invention is measured by the procedure of ASTM D792.

Ethylene-α-Olefin Interpolymer

The ethylene-α-olefin random interpolymers used in the practice of this invention comprise a majority weight percent polymerized ethylene monomer (based on the total weight of polymerizable monomers), and at least one polymerized α-olefin comonomer. These random polyolefins have a density of less than 0.91, typically less than 0.90, more typically less than 0.89 and even more typically less than 0.88, g/cm$^3$. Low density polyolefin interpolymers are generally characterized as amorphous, flexible and having good optical properties, e.g., high transmission of visible and UV-light and low haze.

The ethylene-α-olefin random interpolymers used in the practice of this invention typically has an $I_2$ of 0.1 to 50, more typically 0.2 to 30, g/10 min.

In one embodiment of this invention, the polyolefin random interpolymers are made with a single site catalyst such as a metallocene catalyst or constrained geometry catalyst. The ethylene-α-olefin random interpolymers are made with a single-site catalyst, and typically have a melting point of less than 95, preferably less than 90, more preferably less than 85, even more preferably less than 80 and still more preferably less than 75, ° C. The melting point is measured by differential scanning calorimetry (DSC) as described, for example, in U.S. Pat. No. 5,783,638. Polyolefin random interpolymers with a low melting point often exhibit desirable flexibility and thermoplasticity properties useful in the fabrication of the articles of this invention.

The polyolefin random interpolymers useful in the practice of this invention include ethylene/α-olefin interpolymers having a α-olefin content of between 10 and 20, preferably at least 11 and even more preferably at least 12, mole percent as measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Illustrative terpolymers include ethylene/propylene/1-octene, ethylene/propylene/butene and ethylene-/butene/1-octene.

More specific examples of olefinic random interpolymers useful in this invention include very low density polyethylene (VLDPE), homogeneously branched, linear ethylene/α-olefin interpolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene resins available from The Dow Chemical Company). The more preferred polyolefin interpolymers are the homogeneously branched linear and substantially linear ethylene interpolymers. The substantially linear ethylene interpolymers are especially preferred, and are more fully described in U.S. Pat. Nos. 5,272,236, 5,278,272 and 5,986,028.

Olefin Block Interpolymers

"Multi-block interpolymer", "segmented interpolymer" and like terms refer to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers desirably possess PDI from 1.7 to 3.5, preferably from 1.8 to 3, more preferably from 1.8 to 2.5, and most preferably from 1.8 to 2.2. When produced in a batch or semi-batch process, the polymers desirably possess PDI from 1.0 to 3.5, preferably from 1.3 to 3, more preferably from 1.4 to 2.5, and most preferably from 1.4 to 2.

The term "ethylene multi-block interpolymer" means a multi-block interpolymer comprising ethylene and one or more interpolymerizable comonomers, in which ethylene comprises a plurality of the polymerized monomer units of at least one block or segment in the polymer, preferably at least 90, more preferably at least 95 and most preferably at least 98, mole percent of the block. Based on total polymer weight, the ethylene multi-block interpolymers used in the practice of the present invention preferably have an ethylene content from 25 to 97, more preferably from 40 to 96, even more preferably from 55 to 95 and most preferably from 65 to 85, percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether or an alkane-solvent is less than 10, preferably less than 7, more preferably less than 5 and most preferably less than 2, percent of the total polymer weight.

In addition, the multi-block interpolymers used in the practice of the invention desirably possess a PDI fitting a Schutz-Flory distribution rather than a Poisson distribution. The use of the polymerization process described in WO 2005/090427 and U.S. Ser. No. 11/376,835 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In a further embodiment, the polymers of the invention, especially those made in a continuous, solution polymerization reactor, possess a most probable distribution of block lengths. In one embodiment of this invention, the ethylene multi-block interpolymers are defined as having:

(a) Mw/Mn from about 1.7 to about 3.5, at least one melting point, Tm, in degrees Celsius, and a density, d, in grams/cubic centimeter, where in the numerical values of Tm and d correspond to the relationship $$Tm > -2002.9 + 4538.5(d) - 2422.2(d)^2, \text{ or}$$

(b) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48 C \text{ for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30 C; or (c) Elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(d) Has a molecular weight fraction which elutes between 40 C and 130 C when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (e) Has a storage modulus at 25 C, G'(25 C), and a storage modulus at 100 C, G'(100 C), wherein the ratio of G'(25 C) to G'(100 C) is in the range of about 1:1 to about 9:1.

The ethylene/α-olefin interpolymer may also have:

(a) Molecular fraction which elutes between 40 C and 130 C when fractionated using TREF, characterized in that the fraction has a block index of at least 0.5 and up to about 1 and a molecular weight distribution, Mw/Mn, greater than about 1.3; or (b) Average block index greater than zero and up to about 1.0 and a molecular weight distribution, Mw/Mn greater than about 1.3.

Suitable monomers for use in preparing the ethylene multi-block interpolymers used in the practice of this present invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that can be used in the practice of this invention are elastomeric interpolymers of ethylene, a $C_{3-20}$ α-olefin, especially propylene, and, optionally, one or more diene monomers. Preferred α-olefins for use in this embodiment of the present invention are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. One particularly preferred α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Preferred dienes include 1,4-pentadiene, 1,4-hexadiene, 5-ethylidene-2-norbornene, dicyclopentadiene, cyclohexadiene, and 5-butylidene-2-norbornene. One particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in the practice of this invention have a density of less than 0.90, preferably less than 0.89, more preferably less than 0.885, even more preferably less than 0.88 and even more preferably less than 0.875, g/cc. The ethylene multi-block interpolymers typically have a density greater than 0.85, and more preferably greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze.

The ethylene multi-block interpolymers useful in the practice of this invention have a 2% secant modulus of less than about 150, preferably less than about 140, more preferably less than about 120 and even more preferably less than about 100, mPa as measured by the procedure of ASTM D-882-02. The ethylene multi-block interpolymers typically have a 2% secant modulus of greater than zero, but the lower the modulus, the better the interpolymer is adapted for use in this invention. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this invention because they provide stability under stress, e.g., less prone to crack upon stress or shrinkage.

The ethylene multi-block interpolymers useful in the practice of this invention typically have a melting point of less than about 125. The melting point is measured by the differential scanning calorimetry (DSC) method described in WO 2005/090427 (US2006/0199930). Ethylene multi-block interpolymers with a low melting point often exhibit desirable flexibility and thermoplasticity properties useful in the fabrication of the modules of this invention.

The ethylene multi-block interpolymers used in the practice of this invention, and their preparation and use, are more fully described in U.S. Pat. Nos. 7,579,408, 7,355,089, 7,524,911, 7,514,517, 7,582,716 and 7,504,347.

Other Composition Components

The compositions of the present invention may optionally comprise "additional polymers", including one or more other thermoplastic resin, to provide additional improvements in properties including, but not limited to, processability, modulus, compressive strength, hardness, toughness and aesthetics of the final fabricated article. Examples of the "additional polymers" include, but are not limited to, high density polyethylene (HDPE), medium density polyethylene (MDPE), low density polyethylene (LDPE), linear low density polyethylene (LLDPE), polypropylene (PP), both homopolymer and copolymer, and ethylene-propylene rubber. If an additional polymer is present, typically it is present in an amount of less than 50, more typically less than 45 and even more typically less than 40, wt % based on the total weight of the composition.

Various additives and fillers may be incorporated into the compositions of the present invention. These materials include, without limitation, plasticizers other than phthalate-based plasticizers (e.g., oil, wax, etc.), stability control agents, nucleating agents, inorganic fillers, conductive fillers, pigments, colorants, antioxidants, acid scavengers, ultraviolet absorbers or stabilizers, flame retardants, processing aids, extrusion aids, anti-static agents, cling additives (for example, polyisobutylene), and anti-block additives. These additives and fillers typically do not include any material that would introduce an element that would leach from the final article under its normal use conditions, e.g., an additive that would contain a phthalate or residual styrene monomer that might leach from a toy intend for a small child who might put it in his or her mouth. Examples of antioxidants are hindered phenols (such as, for example, IRGANOX™ 1010) and phosphites (for example, IRGAFOS™ 168) both trademarks of, and commercially available from, Ciba Geigy Corporation.

Plasticizer oils that can be used in the practice of this invention include, but are not limited to, aromatic oil, naphthenic oil, paraffinic oil and combinations of two or more of these oils. If oil is present, then it can comprise up to 50 wt %, but typically it comprises between 5 and 50 wt %, more typically between 10 and 40 wt %, and even more typically between about 20 and 30 wt % of the composition.

Waxes useful in the practice of the invention include Fischer-Tropsch waxes, petroleum-derived waxes, and synthetic waxes. Montan waxes are another type of suitable wax. Most of these waxes are obtained in the process of refining lube oil in which the waxes are separated from the lube oil stock and refined into various fractions of waxes including paraffins and microcrystalline waxes. In addition to synthetic and/or petroleum-derived waxes, a number of other "natural" waxes may be used, such as carnauba waxes, and commercially available high triglyceride waxes derived from the processing of natural oil-containing commodities such as soybeans, palm and other crops, from which oil can be obtained.

The additives and fillers are advantageously employed in functionally equivalent amounts known to those skilled in the art. For example, the amount of antioxidant employed is that amount which prevents the polymer components from undergoing oxidation at the temperatures and environment employed during storage and ultimate use of the articles made from it. Such amount of antioxidants is usually in the range of from 0.01 to 10, preferably from 0.02 to 5, more preferably from 0.03 to 2, wt % based upon the weight of the polymer blend. Similarly, the amounts of any of the other enumerated additives are the functionally equivalent amounts.

Compositions

The compositions of this invention may comprise 100 percent (by weight or volume) of either the ethylene-α-olefin copolymer or the olefin block copolymer, or it may comprise a blend of the two polymers at any ratio, e.g., 99+wt % ethylene-α-olefin copolymer to 1 wt % or less OBC, or vice versa. In one embodiment the composition comprises at least 60 wt % of at least one of an ethylene-α-olefin copolymer and OBC with the remaining content of the composition comprising one or more other polymers and/or additives and/or fillers.

The compositions of this invention are designed to have a Shore A hardness of 50 to 95 and to be paintable by a paint designed to paint SEBS- and SBS-based compositions, or an acrylic-modified paint designed to paint articles made from polypropylene without the need for a primer or other surface treatment. These parameters of Shore A hardness and paintability are a function, at least in part, of the α-olefin content of the composition from which the article is made. The α-olefin content in the final composition is calculated from the α-olefin content in the ethylene-α-olefin copolymer (random or block) and the concentration of each component as follows:

$$C_\alpha = \sum_{k=1}^{n} C_\alpha^k W_\alpha^k / 100$$

in which $C_\alpha$ is the mole % concentration of α-olefin in the final composition, $C_\alpha^k$ is the mole % concentration of α-olefin in the k ethylene-α-olefin copolymer and k can vary from 1 to 4 different ethylene-α-olefin copolymers, and $W_\alpha^k$ is the weight % of the k ethylene-α-olefin copolymer in the final composition. $C_\alpha^k$ can be obtained from the vendors.

In one embodiment the content of α-olefin comonomer in the final composition is 10 or more mol % for a 1-octene based ethylene-α-olefin copolymer-based composition that will be painted with a paint designed for painting SEBS-based compositions and/or an acrylic modified paint designed for painting polypropylene articles. In one embodiment the content of α-olefin comonomer in the final composition is 9.7 or more mol % for 1-octene based ethylene-α-olefin copolymers based compositions and paints designed to paint SBS based compositions.

The compositions of this invention are phthalate-based plasticizer free and styrene-free, and they do not require the use of a phthalate-based plasticizer to achieve the desired level of Shore A hardness. In this regard the paints that are used to paint the compositions of this invention are also free or substantially free of phthalate-based plasticizer and preferably, but not necessarily, free of at least one of (i) halogen-containing polymer, and (ii) styrene monomer and/or leachable, small polymeric units derived from styrene monomer. In one embodiment the paint is free or substantially free of at least two, preferably all three, of (i)-(iii). Representative paints include, but are not limited to, paints comprising chlorinated polyolefins, or styrene-ethylene/butylene copolymers, or amide-containing polymers (e.g., acrylamide), or styrene-acrylate type copolymers (e.g., styrene-butylacrylate), or polyurethanes (aliphatic or aromatic based), or combinations of two or more of these materials. Representative commercially available paints include, but are not limited to, the BAUHINIA paints from Hang Cheung Petrochemical Limited (series 3000, 3200, 3500, 3800 and 5900), and the MP1 paint series from Marbo Italia S.p.A.

In one embodiment the polyolefin elastomer used in the composition is not functionalized with a polar group, and in one embodiment the polyolefin elastomer does not comprise a phenyl group attached to the backbone. These compositions exhibit good processability and they are particularly well adapted for use in applications that are compromised if a component of the composition, e.g., a phthalate-based plasticizer or residual monomer, leaches or otherwise migrates out of the article made from the composition over the course of the normal use the article.

The compositions of this invention are used in toys, footwear, profiles, instrument panel skins, furniture, sporting goods and the like in the same manner as known compositions comprising polyolefin elastomers. In addition to these manufactures, the compositions of this invention can be used in the manufacture of such articles as, but not limited to, gaskets, apparel, hoses and tubing, components for consumer electronics and appliances, and the like. These compositions are used in the same manner as know compositions comprising polyolefin elastomers with and without various fillers and additives, e.g., extrusion, molding, thermoforming, etc.

The following experiments are provided to illustrate various embodiments of the invention. They are not intended to limit the invention as otherwise described and claimed.

All numerical values are approximate, and all parts and percentage are by weight unless otherwise indicated.

Specific Embodiments

Materials and Compositions

The materials used in the following examples are described in Table 1. All of the ethylene-α-olefins (POE) are products of The Dow Chemical Company, and the α-olefin is 1-octene except for POE-2 and POE-6 in which it is 1-butene. PP-1 is Polypropylene PPR 12222 which is a high melt flow index (MFR of 60 g/10 min (230° C./2.16 kg) by ISO 1133, clarified random interpolymer available from Total Petrochemicals. PP-2 is Polypropylene 6D83K which is a random interpolymer resin with an MFR of 1.9 g/10 min (230° C./2.16 kg) by ASTM D1238, and PP-3 is Polypropylene R7021 which is a random interpolymer resin with an MFR of 50 g/10 min (230° C./2.16 kg) by ASTM D1238, both available from The Dow Chemical Company. The oil is Paralux 6001R available from Chevron Texaco, and the filler is calcium carbonate available from Haicheng Xinnuoxier Mining Industry Co., Ltd.

The paints used in these examples are (i) 5900 which is an SBS-based liquid solvent-based paint containing siloxane, (ii) V37 which is an SEBS-based liquid solvent-based paint containing amide and siloxane, and (iii) MP1 SM 631 G which is a styrene/butylacrylate latex, liquid solvent-based paint containing chlorinated polyolefin and an aliphatic or aromatic polyurethane, e.g., isophorone diisocyanate or toluene diisocyanate. The 5900 and V37 paints are available from Hang Cheung Petrochemical Ltd. MP1 SM 631G paint is available from Marbo Italia S.p.A.

TABLE 1

Materials

| Interpolymer | Density $(g/cm^3)$ | Interpolymer Type | α-Olefin Conc. (mol %) | $I_2$ (g/10 min @ 190° C./2.16 kg) |
|---|---|---|---|---|
| POE-1 | 0.856 | Random | 17.7 | 1 |
| POE-2 | 0.86 | Random | 12 | 0.2 |
| POE-3 | 0.897 | Random | 6 | 1.6 |
| POE-4 | 0.87 | Random | 13.1 | 30 |
| POE-5 | 0.885 | Random | 8.7 | 1 |
| POE-6 | 0.862 | Random | 11.4 | 1.2 |
| POE-7 | 0.868 | Random | 13.8 | 0.5 |
| POE-8 | 0.866 | Block | 18 | 0.5 |
| POE-9 | 0.877 | Block | 13.5 | 15 |
| POE-10 | 0.866 | Block | 18 | 15 |
| POE-11 | 0.866 | Block | 18 | 1 |
| PP-1 | 0.902 | N/A | N/A | N/A |
| PP-2 | 0.902 | N/A | N/A | N/A |
| PP-3 | 0.902 | N/A | N/A | N/A |
| Oil | N/A | N/A | N/A | N/A |
| Filler | N/A | N/A | N/A | N/A |

N/A = Not applicable.

Compounding Process

For Samples 1-8 in Table 2, the components are compounded in a twin-screw extruder. The polyolefin elastomer, polypropylene and other components are mixed in a super mixer and then added to extruder through a hopper. The extruder zone temperatures are set at 120, 180, 200, 200, 200, 200, 200, 200, 200, 210° C. and the screw speed is 200 rpm. Compounded samples are then injection molded into plaques and the melt temperature and the mold temperature are set at 200° C. and 25° C., respectively.

For Samples 9-12 in Table 2, the components are compounded using a 300 ml Brabender internal mixer. The polyolefin elastomer, polypropylene and other components are first mixed at 180° C. for about 5 minutes, and then the rotation speed is set at 50 rpm. The compounded samples are then compression molded into plaques (temperature 180° C., time 5 min; pressure 10 MPa).

Adhesion Test

Sample plaques are spray-coated with one of the three paints identified above. After at least 48 hours of drying at room temperature, the sample plaques are sent for adhesion testing which is performed according to ASTM 3359-02 at room temperature using the following procedure:

1. Scratch the surface of the painted plaque both vertically and horizontally with a tool holding 11 cutting blades separated from each other at 2 mm distance so as to create a square of 4 $cm^2$, cut in 100 small squares of 4 $mm^2$;

2. Apply an adhesive tape (TESAFIX 04970-00154-00 available from Tesa) with sufficient pressure and wait for 1 minute, then pull it off rapidly. Repeat a second time with a new piece of tape;

3. Report the number of squares in which the paint is still intact from the 100 cross-hatched cells according to following scale:

0B—<35
1B—35 to 65
2B—65 to 85
3B—85 to 95
4B—>95
5B—100

Figure 2:
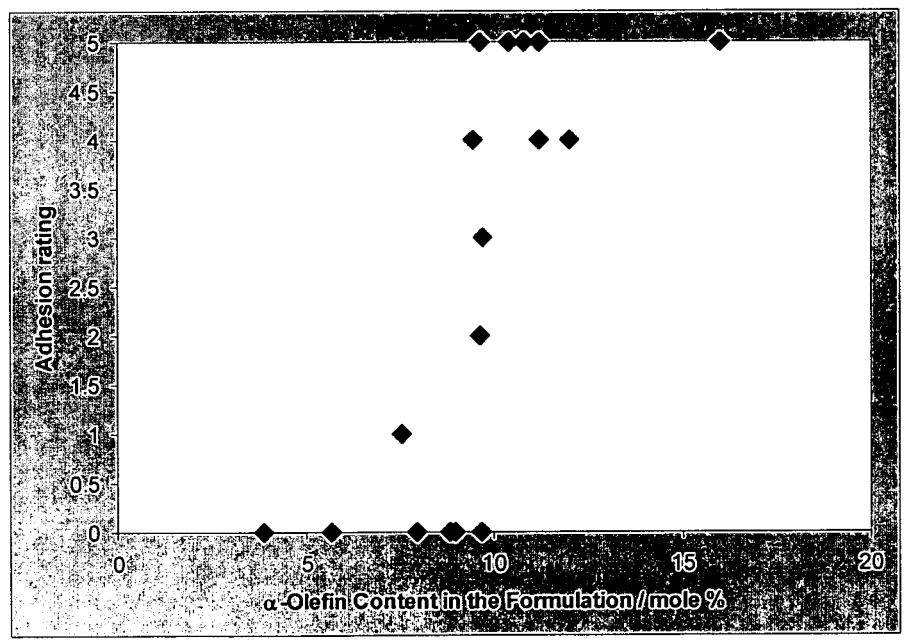
FIG. 2 is a graph reporting the adhesion rating of a paint designed for articles comprising SBS rubber on articles made from polyolefin compositions comprising various levels of an ethylene-α-olefin interpolymer. The adhesion rating is reported as a function of the α-olefin comonomer content in the composition.

Table 2 reports 18 examples. Paint rating of 5 is often necessary for commercial acceptability. FIGS. 1 and 2 show the paint (i.e., adhesion) rating as a function of α-olefin co-monomer for V37 and 5900 paints respectively. Consistent paint ratings of 5 are not achieved until the plaques comprise 10 or more mol % of α-olefin co-monomer. This onset might happen at a lower value for the acrylic modified paint for the 4 inventive examples shown (13, 14, 15 and 16). From the data in Table 1, this can occur at about 7 mole %.

2. The article of claim 1 in which the random ethylene-α-olefin interpolymer is a substantially linear, homogeneous ethylene-α-olefin interpolymer.

3. The article of claim 1 in which the multi-block ethylene-α-olefin interpolymer has (a) a molecular fraction that elutes between about 40° C. and about 130° C. when fractionated using temperature rising effluent fractionation (TREF), characterized in that the fraction has a block index of at least 0.5 and up to 1 and a molecular weight distribution (MWD) greater than 1.3, or (b) an average block index greater than zero and up to 1.0 and an MWD greater than 1.3.

4. The article of claim 3 in which the ethylene multi-block interpolymer has at least one of the following properties: (i) a molecular weight distribution of greater than 1.3, (ii) a density of less than 0.90 g/cc, (iii) a 2% secant modulus of less than 150 MegaPascal (MPa) as measured by ASTM D-882-02, (iv) a melt point of less than 125° C., (v) an ∀-olefin content of at least 10 and less than 80 wt % based on the

TABLE 2

Shore A Hardness and Adhesion Test Results

| Component | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| POE 1 | 50 | | 40 | 25 | 50 | 35 | | | | | | | | | | | | |
| POE 2 | | 50 | | | | | | | | | | | | | | | | |
| POE 3 | | | | | | | 65 | | | | | | | | | | | |
| POE 4 | 15 | 15 | 20 | 40 | | 20 | | | | | | | | | | | | |
| POE 5 | | | | | | | | 65 | | | | | | | | | | |
| POE 6 | | | | | | | | | | | | | 35 | | | | | |
| POE 7 | | | | | | | | | | | | | | 35 | | | | |
| POE 8 | | | | | | | | | 100 | 65 | 30 | 30 | | | | | | |
| POE 9 | | | | | | | | | | | | | 70 | 56 | | | | |
| POE 10 | | | | | | | | | | | | | | | 70 | 75 | | |
| POE 11 | | | | | | | | | | | | | | | | | 56 | 70 |
| PP1 | 35 | 35 | 30 | | 40 | 35 | | | | | | | | | | | | |
| PP2 | | | | | | | | | | 35 | 35 | 35 | | | | | | |
| PP3 | | | | | | | | | | | | | 30 | 24 | 30 | 25 | 24 | 30 |
| OIL 1 | | | | | | | | | | | | | | 20 | | | 20 | |
| FILLER 1 | | | 10 | 35 | 10 | 10 | 35 | 35 | | | | | | | | | | |
| Blend α-Olefin Content (Mol %) | 10.8 | 7.9 | 9.7 | 9.7 | 8.8 | 8.8 | 3.9 | 5.7 | 18.0 | 11.7 | 10.2 | 10.2 | 12.6 | 10.1 | 12.6 | 13.5 | 10.1 | 11.2 |
| Shore A Hardness | 88 | 88 | 86 | 70 | 94 | 90 | 93 | 89 | 65 | 86 | 88 | 89 | 92 | 80 | 82 | 80 | 69 | 71 |
| 5900 paint | 5B | 0B | 3B | 0 | 0 | 0 | 0 | 0 | 5B | 5B | 2B | 5B | 4B | 1B | 4B | 4B | 0 | 5B |
| V37 paint | 5B | 5B | 3B | 5B | 3B | 3B | 0 | 0 | 5B | 5B | 5B | 5B | 5B | 1B | 5B | 5B | 5B | 5B |
| MP1FM 631G paint | | | | | | | | | | | | | 5B | 4B | 5B | 5B | | |

Although the invention has been described with certain detail through the preceding specific embodiments, this detail is for the primary purpose of illustration. Many variations and modifications can be made by one skilled in the art without departing from the spirit and scope of the invention as described in the following claims.

The invention claimed is:

1. An article made from a polyolefin composition (A) comprising at least one of a (1) random ethylene-alpha-olefin interpolymer having a density of equal to or less than (≦) 0.91 g/cm³, or (2) multi-block ethylene-alpha-olefin interpolymer, (B) free of (1) phthalate-based plasticizer, (2) halogen-containing polymer, and (3) leachable, small polymeric units derived from styrene monomer, and (C) having a Shore A hardness of 50 to 95, with the proviso that the content of the alpha-olefin in the polyolefin composition is at least 9.7 mole percent, the article painted without primer or other surface treatment with paint free of phthalate-based plasticizer, and (A) designed for painting an SBS- or SEBS-type rubber based composition, or (B) is an acrylic-modified paint designed for painting a polypropylene-based composition.

weight of the interpolymer, (vi) a Tg of less than −35° C., and (vii) a melt index (MI) of less than 100 grams per 10 minutes (g/10 min).

5. The article of claim 1 further comprising at least one additional polymer.

6. The article of claim 5 in which the additional polymer is polypropylene.

7. The article of claim 1 in the form of at least one of a toy, footwear, profile, instrument panel skin, furniture, sporting good, gasket, apparel, hose or tubing, and a component for a consumer electronic device or an appliance.

8. The article of claim 1 in which the paint is free of at least one of (i) halogen-containing polymer, and (ii) styrene monomer and/or leachable, small polymeric units derived from styrene monomer.

9. The article of claim 1 in which the paint is free or substantially free of (i) halogen-containing polymer, and (ii) styrene monomer and/or leachable, small polymeric units derived from styrene monomer.

* * * * *